(12) United States Patent
Sugahara et al.

(10) Patent No.: US 8,826,042 B2
(45) Date of Patent: Sep. 2, 2014

(54) MEMORY CONTROLLER, MEMORY CONTROL APPARATUS, MEMORY DEVICE, MEMORY INFORMATION PROTECTION SYSTEM, CONTROL METHOD FOR MEMORY CONTROL APPARATUS, AND CONTROL METHOD FOR MEMORY DEVICE

(75) Inventors: Takahiko Sugahara, Osaka (JP); Tetsuo Furuichi, Osaka (JP); Ikuo Yamaguchi, Osaka (JP); Takashi Oshikiri, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 13/257,680

(22) PCT Filed: Apr. 5, 2010

(86) PCT No.: PCT/JP2010/056148
§ 371 (c)(1),
(2), (4) Date: Sep. 20, 2011

(87) PCT Pub. No.: WO2010/119784
PCT Pub. Date: Oct. 21, 2010

(65) Prior Publication Data
US 2012/0008772 A1    Jan. 12, 2012

(30) Foreign Application Priority Data

Apr. 14, 2009 (JP) ................................. 2009-097829
Apr. 23, 2009 (JP) ................................. 2009-105131

(51) Int. Cl.
*G06F 21/00* (2013.01)
*H04L 9/00* (2006.01)

(52) U.S. Cl.
USPC ............................ 713/193; 380/46; 380/265

(58) Field of Classification Search
None
See application file for complete search history.

(56) References Cited

U.S. PATENT DOCUMENTS 6,307,940 B1 * 10/2001 Yamamoto et al. ........... 380/277
2004/0243830 A1 * 12/2004 Kutcherov et al. ........... 713/200
(Continued)

FOREIGN PATENT DOCUMENTS

JP    7-219852       8/1995
JP    10-91066 A     4/1998
(Continued)

OTHER PUBLICATIONS

International Preliminary Report on Patentability issued Nov. 24, 2011, in PCT/JP2010/056148 (English translation only).

(Continued)

*Primary Examiner* — Gilberto Barron, Jr.
*Assistant Examiner* — Malcolm Cribbs
(74) *Attorney, Agent, or Firm* — Oblon, Spivak, McClelland, Maier & Neustadt, L.L.P.

(57) ABSTRACT

A technique allowing an improvement in the confidentiality of information stored in a memory device. A memory controller includes a key generation part that newly generates key information for use in encryption and decryption of information at every predetermined timing, and a data conversion circuit that encrypts information to be outputted to a memory device based on the information and decrypts encrypted information inputted from the memory device based on the key information. In the data conversion circuit, each time the key generation part generates new key information, key information is updated so as to set the new key information as the key information.

30 Claims, 13 Drawing Sheets

(56) References Cited

U.S. PATENT DOCUMENTS

| | | | |
|---|---|---|---|
| 2006/0282898 A1* | 12/2006 | Yamamoto et al. | 726/26 |
| 2007/0118880 A1 | 5/2007 | Mauro, II | |
| 2007/0136407 A1* | 6/2007 | Rudelic | 708/250 |
| 2008/0183982 A1 | 7/2008 | Sugahara et al. | |
| 2008/0260159 A1* | 10/2008 | Osaki | 380/277 |
| 2009/0019551 A1* | 1/2009 | Haga et al. | 726/27 |

FOREIGN PATENT DOCUMENTS

| | | |
|---|---|---|
| JP | 2001 285278 | 10/2001 |
| JP | 2002-300151 A | 10/2002 |
| JP | 2003-249929 A | 9/2003 |
| JP | 2005-174388 A | 6/2005 |
| JP | 2007 300309 | 11/2007 |
| JP | 2008 124935 | 5/2008 |
| WO | 2007 062020 | 5/2007 |

OTHER PUBLICATIONS

Written Opinion of the International Searching Authority issued Jun. 29, 2010, in PCT/JP2010/056148 (with English-language translation).

International Search Report issued Jun. 29, 2010 in PCT/JP10/056148 filed Apr. 5, 2010.

U.S. Appl. No. 13/257,644, filed Sep. 20, 2011, Sugahara, et al.

Office Action issued Sep. 3, 2013 in Japanese Patent Application No. 2009-097829 with partial English langue translation.

Office Action issued on Jan. 27, 2014 in Japanese Patent Application No. 2009-097829 with its English translation.

\* cited by examiner

F I G . 1
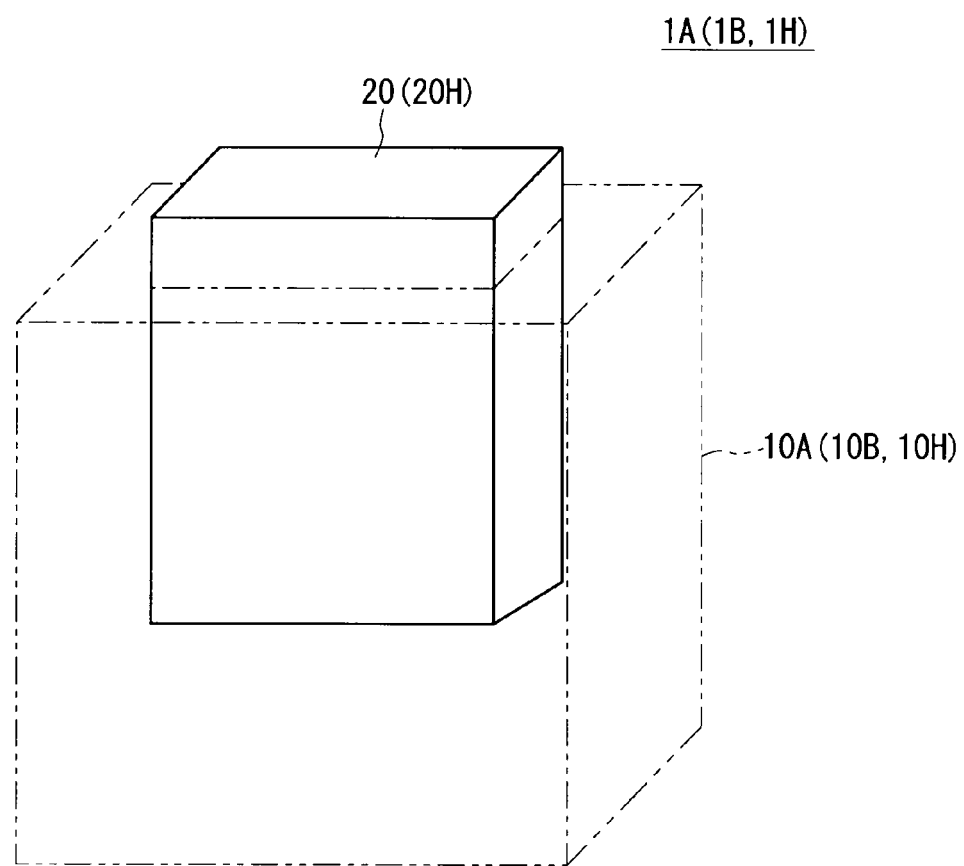

F I G . 4
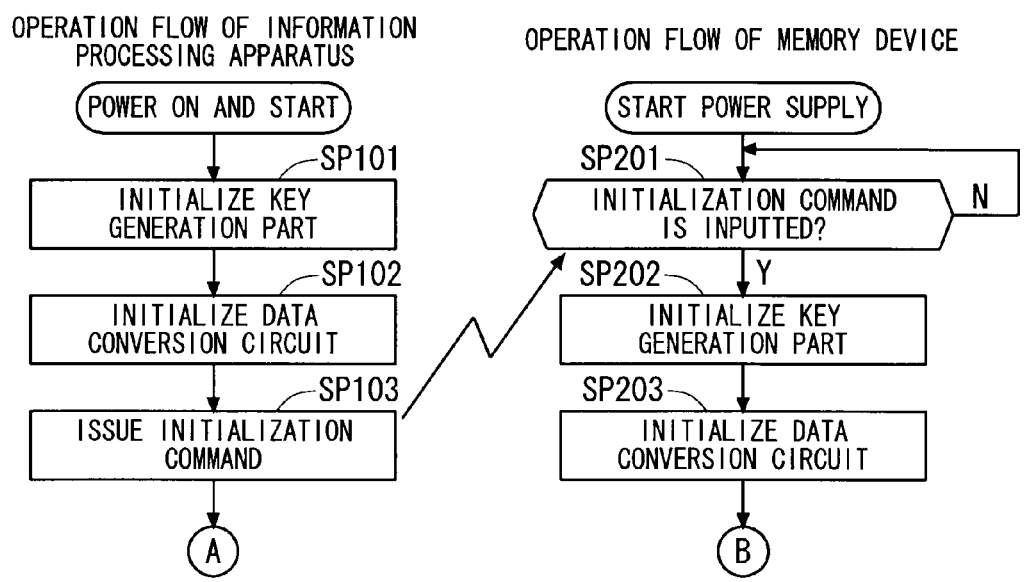

F I G. 6
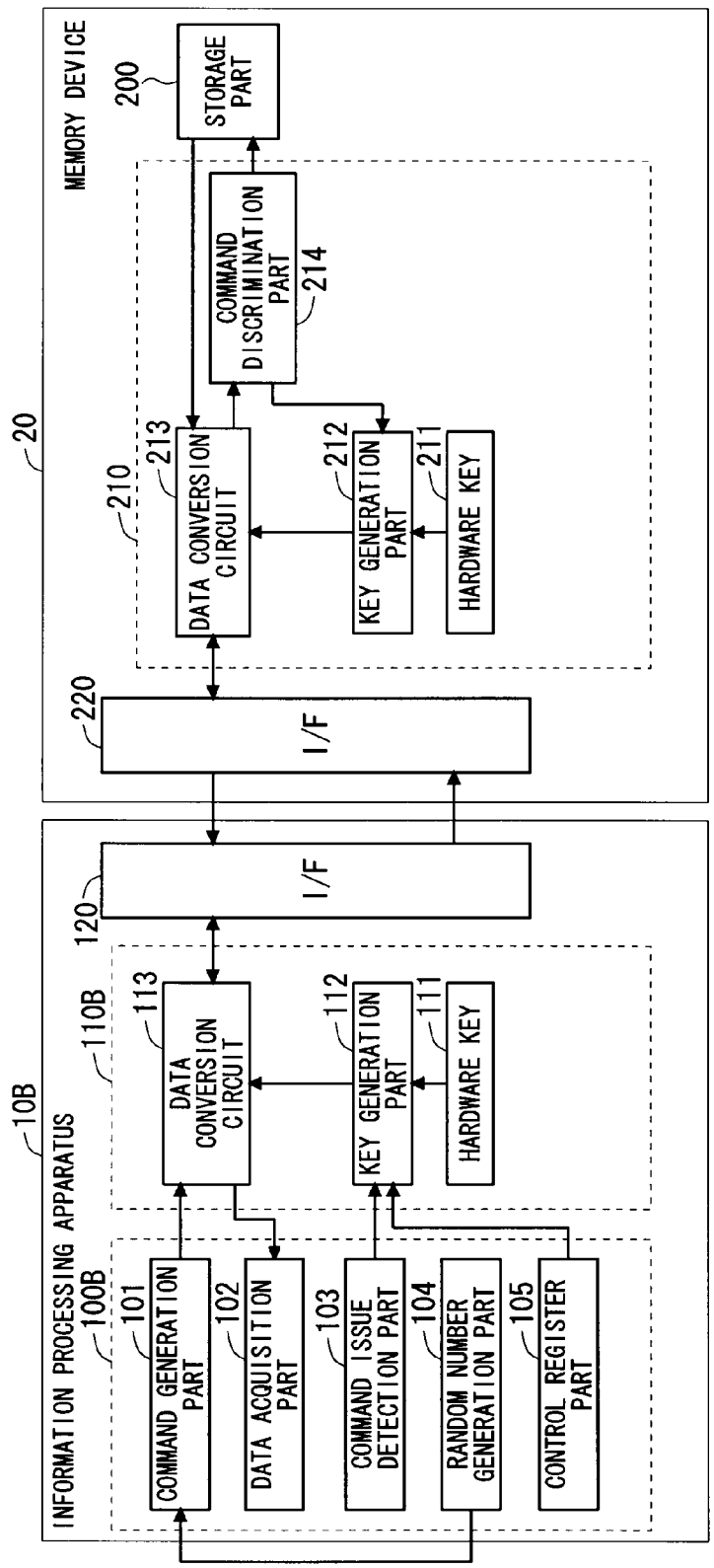

F I G. 1 0
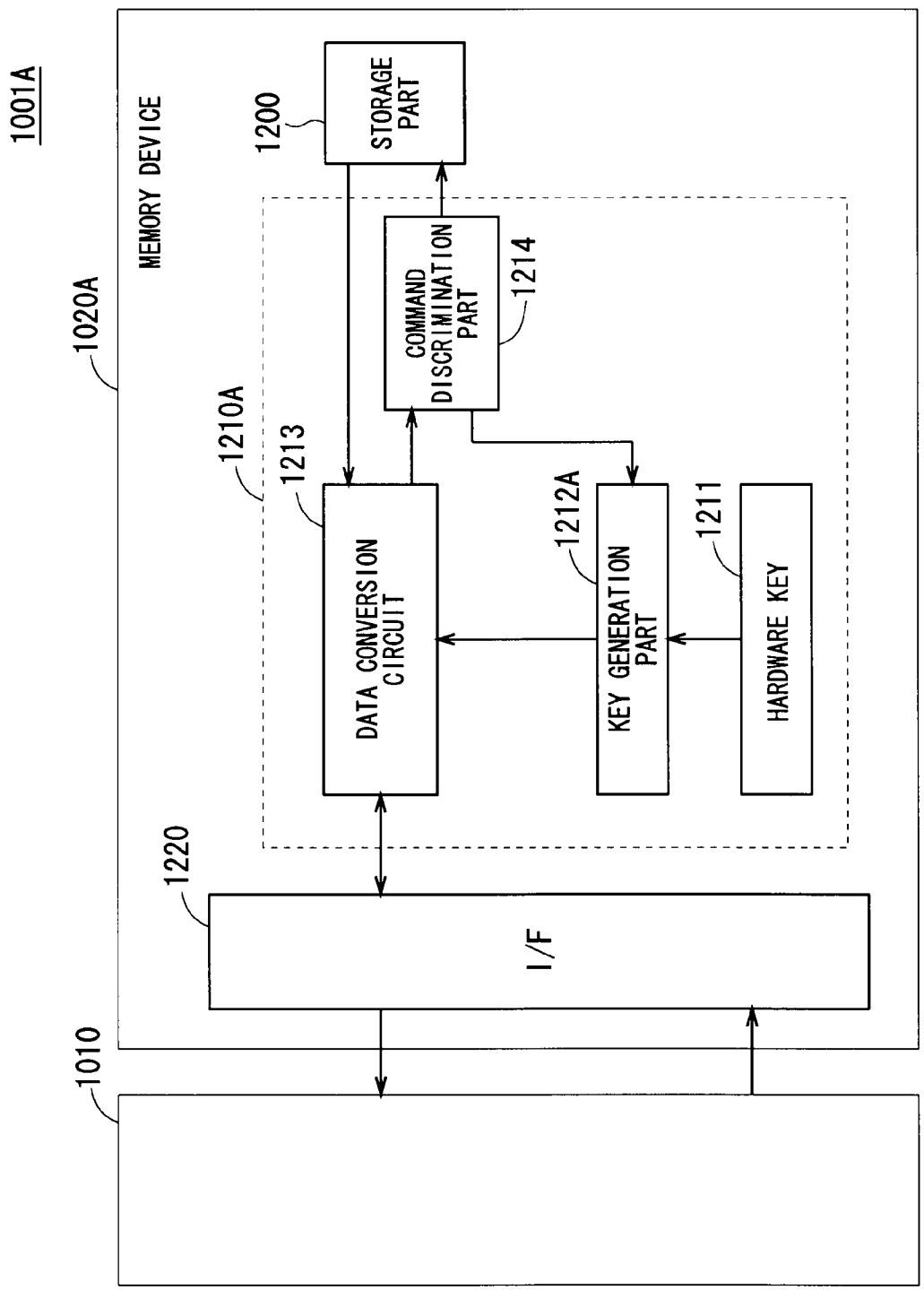

US 8,826,042 B2

MEMORY CONTROLLER, MEMORY CONTROL APPARATUS, MEMORY DEVICE, MEMORY INFORMATION PROTECTION SYSTEM, CONTROL METHOD FOR MEMORY CONTROL APPARATUS, AND CONTROL METHOD FOR MEMORY DEVICE

TECHNICAL FIELD

The present invention relates to a technique of ensuring a confidentiality of information, or a processing technique for encrypting information.

BACKGROUND ART

In a known technique, a removable memory device such as a semiconductor memory is mounted to an information processing apparatus that is an external apparatus of the memory device, and a predetermined function is implemented in the information processing apparatus by using information such as a software program or data that is stored in the memory device.

This type of a memory device may sometimes be provided with a security function for ensuring the confidentiality of the information stored in the memory device. For example, Patent Document 1 discloses a method in which data outputted from a storage part is encrypted by using key data. The Patent Document 1 proposes a technique of additionally providing an encryption circuit in the semiconductor memory to thereby apply more complicated encryption to a signal outputted from the semiconductor memory.

PRIOR-ART DOCUMENTS

Patent Documents

Patent Document 1: Japanese Patent Application Laid-Open No. 1995-219852

SUMMARY OF THE INVENTION

Problems to be Solved by the Invention

However, in the Patent Document 1 mentioned above, there is a possibility that the confidentiality of the information stored in the memory device may be jeopardized if key information is acquired by analyzing the encrypted output signal.

Therefore, a primary object of the present invention is to provide a technique allowing an improvement in the confidentiality of information stored in a memory device.

Additionally, an application of more complicated encryption to information outputted from a memory device as described in the above-mentioned Patent Document 1 increases a processing time required for the encryption, which may cause a reduction in the throughput of an external apparatus that uses the information stored in the memory device.

Therefore, a secondary object of the present invention is to provide a technique allowing prevention of a reduction in the throughput of an external apparatus that uses information stored in a memory device.

Means for Solving the Problems

A first aspect of the present invention is a memory controller including: a key generation part for newly generating key information for use in encryption and decryption of information at every predetermined timing; and a data conversion part for encrypting information to be outputted to a memory device storing predetermined information therein based on the key information, and decrypting the encrypted predetermined information inputted from the memory device based on the key information, wherein, in the data conversion part, each time the key generation part generates new key information, key information is updated so as to set the new key information as the key information.

A second aspect of the present invention is a memory device including: an instruction part for giving generation instruction of key information for use in encryption and decryption of information at every predetermined timing; a key generation part for newly generating the key information in accordance with the generation instruction; a storage part storing predetermined information therein; and a data conversion part for encrypting a read-out object piece of the predetermined information based on the key information, and decrypting encrypted information inputted from an external apparatus based on the key information, wherein, in the data conversion part, each time the key generation part generates new key information, key information is updated so as to set the new key information as the key information.

A third aspect of the present invention is a memory information protection system including: a memory device storing predetermined information therein; and a memory control apparatus associated with the memory device, wherein the memory control apparatus includes: a first key generation part for newly generating first key information for use in encryption and decryption of information at every predetermined timing; and a first data conversion part for encrypting information to be outputted to the memory device based on the first key information, and decrypting encrypted information inputted from the memory device based on the first key information, in the first data conversion part, each time the first key generation part generates new first key information, key information is updated so as to set the new first key information as the first key information, the memory device includes: a second key generation part for newly generating second key information identical to the first key information, in synchronization with the every predetermined timing; a storage part storing predetermined information therein; and a second data conversion part for encrypting a read-out object piece of the predetermined information based on the second key information, and decrypting encrypted information inputted from the memory control apparatus based on the second key information, in the second data conversion part, each time the second key generation part generates new second key information, key information is updated so as to set the new second key information as the key information.

A fourth aspect of the present invention is a memory device including: a storage part storing predetermined information therein; a key generation part for generating key information for use in encryption and decryption of information; a data conversion part for encrypting information to be outputted to an external apparatus based on the key information, and decrypting encrypted input information inputted from the external apparatus based on the key information; and an instruction part for discriminating the input information decrypted by the data conversion part, and giving execution instruction of a predetermined operation in accordance with the input information, wherein in a case where the input information includes a read-out command for reading out the predetermined information, the instruction part gives generation instruction of the key information to the key generation part and gives read-out instruction to the storage part in accordance with the read-out command, the key generation part generates new key information in accordance with the generation instruction within a read-out time period in which the storage part reads out the predetermined information in accordance with the read-out instruction.

A fifth aspect of the present invention is a memory device including: a storage part storing predetermined information therein; a key generation part for generating key information for use in encryption and decryption of information; a data conversion part for encrypting information to be outputted to an external apparatus based on the key information, and decrypting encrypted information inputted from the external apparatus based on the key information; and an instruction part for discriminating the input information decrypted by the data conversion part, and giving execution instruction of a predetermined operation in accordance with the input information, wherein the key generation part generates new key information at a predetermined timing, in a case where the input information includes a read-out command for reading out the predetermined information, the instruction part gives read-out instruction to the storage part in accordance with the read-out command, after starting to read out information in accordance with the read-out instruction, the storage part transmits a read-out start signal indicating that read-out processing is in execution to the data conversion part, the data conversion part updates key information using the new key information in accordance with reception of the read-out start signal.

A sixth aspect of the present invention is a memory device including: a storage part storing predetermined information therein; a key generation part for generating key information for use in encryption and decryption of information; a data conversion part for encrypting information to be outputted to an external apparatus based on the key information, and decrypting encrypted input information inputted from the external apparatus based on the key information; and an instruction part for discriminating the input information decrypted by the data conversion part, and giving execution instruction of a predetermined operation in accordance with the input information, wherein the key generation part generates new key information at a predetermined timing, in a case where the input information includes a read-out command for reading out the predetermined information, the instruction part gives update instruction of the key information to the data conversion part and gives read-out instruction to the storage part in accordance with the read-out command, the data conversion part updates key information using the new key information in accordance with the update instruction within a read-out time period in which the storage part reads out the predetermined information in accordance with the read-out instruction.

Effects of the Invention

In the invention according to any of the first to third aspects described above, the confidentiality of the information stored in the memory device can be improved.

In the invention according to any of the fourth to sixth aspects described above, a reduction in the throughput of the external apparatus that uses the information stored in the memory device can be prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a configuration of an external appearance of a memory information protection system.

FIG. 4 is a flowchart showing an operation of the memory information protection system according to the first embodiment.

FIG. 6 is a block diagram showing a functional configuration of a memory information protection system according to a second embodiment.

FIG. 10 is a block diagram showing a functional configuration of a memory information protection system according to a third embodiment.

EMBODIMENT FOR CARRYING OUT THE INVENTION

Hereinafter, embodiments of the present invention will be described with reference to the drawings.

<1. First Embodiment>

[1-1. Outline of Configuration]

FIG. 1 is a diagram showing a configuration of an external appearance of a memory information protection system 1A.

As shown in FIG. 1, the memory information protection system 1A includes an information processing apparatus 10A and a memory device 20.

The memory device 20 stores information (also referred to as "memory information" or "stored information") such as program and/or data in a memory core such as a universal mask ROM. Examples of the memory information include data of application software executable by the information processing apparatus 10A that is one type of a computer equipment, and/or data for use in the application software. The memory device 20 is in the form of a card or a cartridge, for example, and removably mounted to the information processing apparatus 10A. The memory device 20 is used in a state of being mounted to the information processing apparatus 10A.

Examples of the information processing apparatus 10A that uses the memory information stored in the memory device 20 include a portable information terminal device such as a personal computer (PC) and a PDA (Personal Digital Assistant), and an image processing apparatus.

In the memory information protection system 1A, when a command (encrypted command) that is encrypted is supplied from the information processing apparatus 10A to the memory device 20, the memory device 20 decrypts the encrypted command and executes a process designated by the command.

[1-2. Functional Block]

Figure 2:
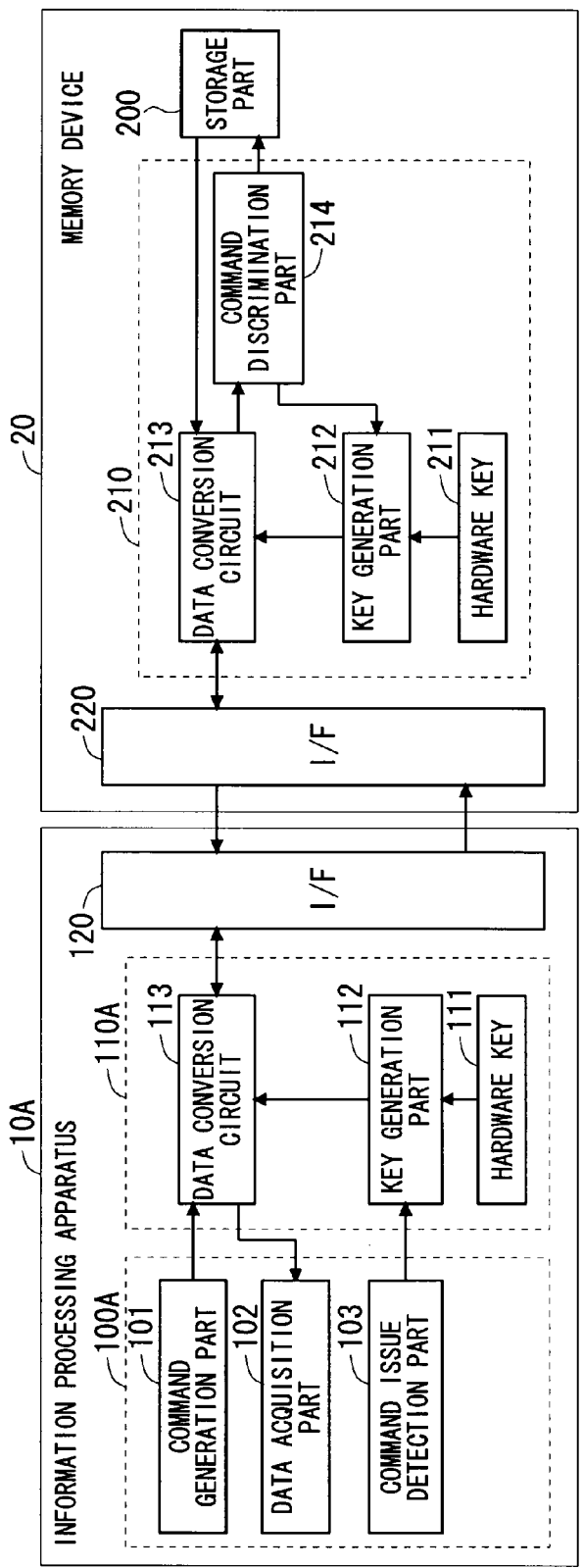
FIG. 2 is a block diagram showing a functional configuration of a memory information protection system according to a first embodiment.

Next, a detailed description will be given of functions of the memory information protection system 1A. FIG. 2 is a block diagram showing a functional configuration of the memory information protection system 1A according to the first embodiment.

As shown in FIG. 2, the information processing apparatus 10A included in the memory information protection system 1A comprises an overall control part 100A, a memory control part (memory controller) 110A, and an interface part 120.

The overall control part 100A is configured as a microcomputer, and mainly includes a CPU, a RAM, a ROM, and the like. The overall control part 100A reads out the program stored in the ROM, and executes the program in the CPU, to implement various functions.

More specifically, the overall control part 100A functionally implements a command generation part 101, a data acquisition part 102, and a command issue detection part 103, by the execution of the above-mentioned program.

The command generation part 101 has a function of generating a command including an order code concerning an instruction to the memory device 20, or including this order code and an address. For example, when reading out the data stored in the memory device 20, the command generation part 101 generates a command (also referred to as a "read-out command") including a read-out order code and an address of the data to be read.

The data acquisition part 102 sequentially stores the data read out from the memory device 20 into a storage part (RAM) within the overall control part 100A, and determines whether or not the acquisition of the data to be read is terminated (completed).

The command issue detection part 103 has a function of detecting a command output from the command generation part 101, and in a case of detecting the command output, instructs a key generation part 112 which will be described later to generate key information (key data) used for encryption or decryption. That is, the command issue detection part 103 also functions as an instruction part for giving generation instruction of the key information to the key generation part 112 in accordance with the command output.

The memory control part 110A includes a hardware key 111, a key generation part 112, and a data conversion circuit (data conversion part) 113.

The hardware key 111 is static data mounted on a chip in the form of hardware. The hardware key 111 can be implemented by, for example, using a plurality of inverters (NOT circuits) corresponding to a bit length of the hardware key 111 and clamping an input of each inverter to a power supply voltage (Vcc) or a GND (ground potential). Since the hardware key 111 is the static data embodied as hardware, the hardware key 111 may be also expressed as key data not interfered by the CPU.

The key generation part 112 has a function of newly generating key information used for the encryption and decryption of information by executing computation processing at every predetermined timing.

To be specific, when the information processing apparatus 10A is powered on, the key generation part 112 generates initial key information based on the hardware key 111 (initialization of the key generation part 112). The key generation part 112 is configured to have a shift part for shifting a bit string that forms the key information, and lets the bit string that forms the initial key information shift sequentially in accordance with a key generation instruction given from the command issue detection part 103, thereby generating new key information.

For example, a shift register is adoptable as the shift part. In a case where the shift register is adopted as the shift part, the key generation part 112 may be configured such that, upon reception of each key generation instruction, a clock can be inputted to the shift register and a bit string of the hardware key 111 can be sequentially inputted to the shift register in accordance with an input of the clock.

For the generation of the initial key information, for example, a pseudo random number generating circuit is adoptable. In a case where the key generation part 112 is configured to have the pseudo random number generating circuit, the pseudo random number generating circuit generates a pseudo random number based on the hardware key 111 and the generated pseudo random number is used as the initial key information.

In this manner, the generation of the key information in the information processing apparatus 10A is performed in accordance with the key generation instruction given from the command issue detection part 103 in synchronization with a command issue, so that new key information is generated each time a new command is issued.

The data conversion circuit 113 has a function of generating an encrypted command by applying, to the command outputted from the command generation part 101, predetermined computation processing using the key information generated by the key generation part 112. The encrypted command encrypted by the data conversion circuit 113 is supplied to the memory device 20 via the interface part 120. For example, a stream encryption method or a block encryption method is adoptable as an encryption method.

The data conversion circuit 113 also has a function of decrypting the encrypted data given from the memory device 20 by using the key information generated by the key generation part 112. The decrypted data is supplied to the data acquisition part 102.

In the data conversion circuit 113 for encrypting and decrypting information, each time the key generation part 112 generates new key information, update of the key information is performed to set the new key information as key information used for the encryption and decryption.

An apparatus including such a memory control part 110A operates as a memory control apparatus for controlling an operation of the memory device 20. This embodiment illustrates a case where the memory control part 110A is provided in the information processing apparatus 10A so that the information processing apparatus 10A operates as the memory control apparatus.

The memory device 20 included in the memory information protection system 1A includes a storage part 200, an in-memory control part 210, and an interface part 220.

The storage part 200 is a nonvolatile memory such as a mask ROM, and stores therein a program, data, and/or the like, whose confidentiality is to be ensured or which is to be protected from unauthorized reading. The storage part 200 is not limited to a mask ROM, but may be a flash memory, an EP-ROM, a hard disk (HD), or the like.

The in-memory control part 210 includes a hardware key 211, a key generation part 212, a data conversion circuit 213, and a command discrimination part 214.

The hardware key 211 is static data mounted on a chip in the form of hardware. The hardware key 211 has the same data configuration as that of the hardware key 111 of the information processing apparatus 10A.

Similarly to the key generation part 112 of the information processing apparatus 10A, the key generation part 212 has a function of newly generating key information used for the encryption and decryption by executing computation processing at every predetermined timing. To be specific, when the initialization command issued by the information processing apparatus 10A after the information processing apparatus 10A is powered on is detected, the key generation part 212 generates initial key information based on the hardware key 211 (initialization of the key generation part 212). The key generation part 212 is configured to have a shift part (exemplified by a shift register) for shifting a bit string that forms the key information, and lets the initial key information shift sequentially in accordance with a key generation instruction given from the command discrimination part 214, thereby generating new key information.

The data conversion circuit 213 has a function of decrypting an encrypted command by applying, to the encrypted command received from an external apparatus (here, the information processing apparatus 10A) via the interface part 220, predetermined computation processing using the key information generated by the key generation part 212. The command decrypted by the data conversion circuit 213 is supplied to the command discrimination part 214.

The data conversion circuit 213 also has a function of generating encrypted data by encrypting data read out from the storage part 200 using the key information generated by the key generation part 212. The encrypted data encrypted by the data conversion circuit 213 is supplied to the information processing apparatus 10A via the interface part 220.

In the data conversion circuit 213 for encrypting and decrypting information, each time the key generation part 212 generates new key information, update of the key information is performed to set the new key information as key information used for the encryption and decryption.

The command discrimination part 214 discriminates the decrypted command, and gives execution instruction of a predetermined operation in accordance with the command. For example, in a case where the command given from the information processing apparatus 10A and decrypted by the data conversion circuit 213 is a read-out command for reading out data from the storage part 200, the command discrimination part 214 extracts a read-out order code and read-out address data from the read-out command, and gives a read-out signal and the read-out address data to the storage part 200.

The command discrimination part 214 also functions as an instruction part for giving generation instruction of key information to the key generation part in accordance with a command input.

In this manner, the generation of the key information in the memory device 20 is executed in accordance with the key generation instruction given from the command discrimination part 214 in synchronization with reception of a command. In the memory device 20, the key information is updated each time a new command is received.

As described above, in the memory information protection system 1A including the information processing apparatus 10A and the memory device 20, the communication of the information (also referred to as "communication information") such as a command or data between the information processing apparatus 10A and the memory device 20 is performed with the encryption. The key information used for the encryption and/or decryption is occasionally updated in the information processing apparatus 10A and the memory device 20 being in synchronization with each other at every predetermined timing.

Figure 3:
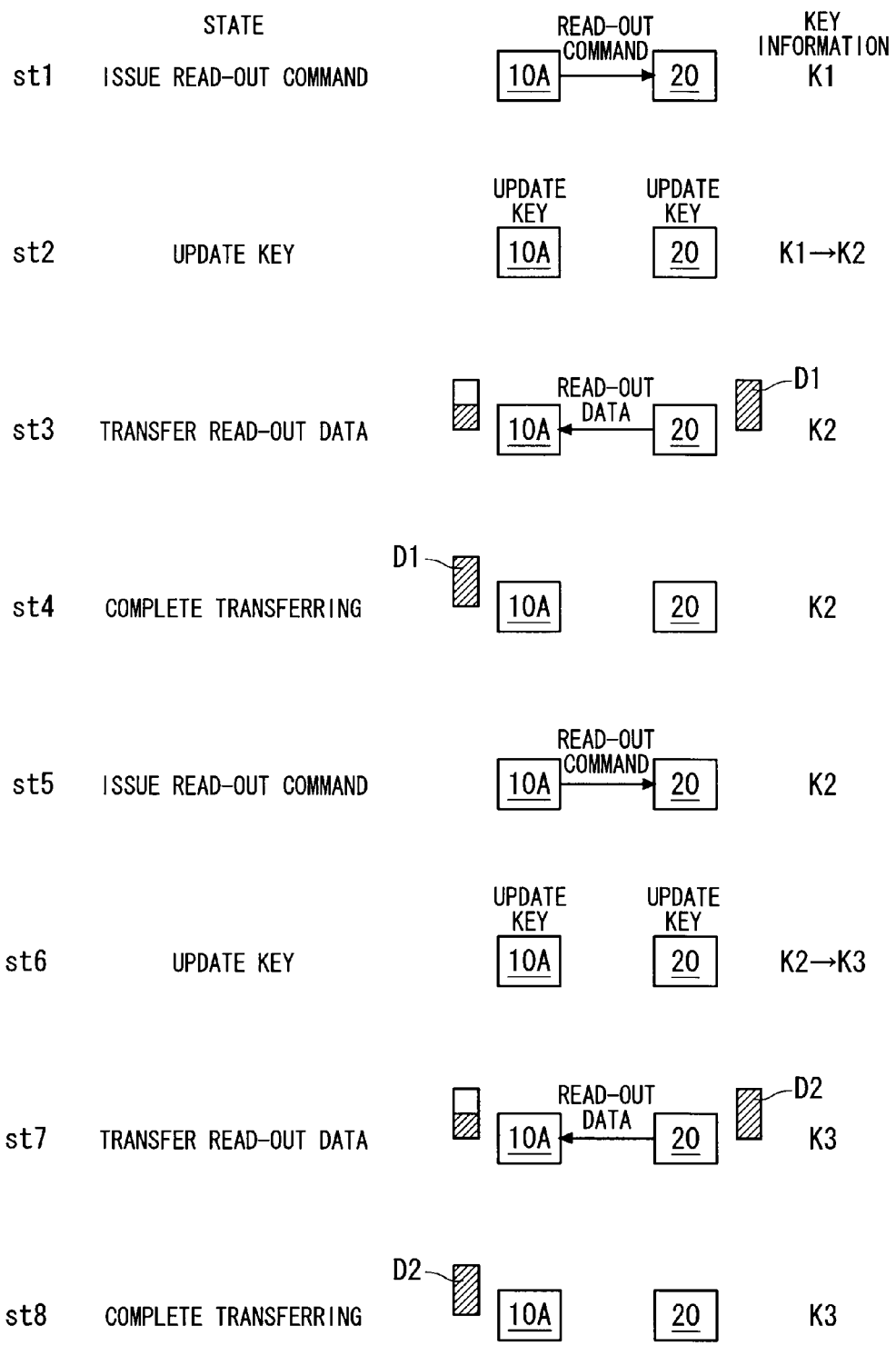
FIG. 3 is a diagram showing a transition of the state of the memory information protection system at a time of reading out data.

A case of reading out the data stored in the memory device 20 will be described as a specific example. FIG. 3 is a diagram showing a transition of the state of the memory information protection system 1A at a time of reading out the data.

As shown in FIG. 3, if the read-out command encrypted based on key information K1 is issued from the information processing apparatus 10A (state st1), new key information K2 is generated in each of the information processing apparatus 10A and the memory device 20 (state st2).

In transferring read-out data D1 in accordance with the read-out command, the read-out data D1 is encrypted based on the new key information K2 in the memory device 20, and the encrypted read-out data is transferred to the information processing apparatus 10A (state st3). In the information processing apparatus 10A, the encrypted read-out data is decrypted using the key information K2, and the read-out data is received. The reading out of the data is performed until the reading out of data having a designated data length is terminated. When the read-out data D1 having the designated length is read out, the reading out is completed (state st4).

To further read out data from the memory device 20, a read-out command is encrypted using the key information K2 in the information processing apparatus 10A, and the encrypted read-out command is issued again (state st5). Upon the issuance of the read-out command, new key information K3 is generated in each of the information processing apparatus 10A and the memory device 20 (state st6).

In transferring read-out data D2 in accordance with the read-out command, the read-out data D2 is encrypted based on the new key information K3 in the memory device 20, and the encrypted read-out data is transferred to the information processing apparatus 10A (state st7). In the information processing apparatus 10A, the encrypted read-out data is decrypted using the key information K3, and the read-out data is received.

In this manner, the information processing apparatus 10A and the memory device 20 have the key generation parts 112 and 212 in common and the hardware keys 111 and 211 in common, and newly generate the key information in common while being in synchronization with each other at every predetermined timing. The information processing apparatus 10A and the memory device 20 perform, in the data conversion circuits 113 and 213 in common, update operations for updating the key information used for encrypting and decrypting the communication information by using the newly generated key information.

This enables the information processing apparatus 10A and the memory device 20 to perform the encryption and decryption using the common key information updated at every predetermined timing. This can increase the confidentiality of the memory information stored in the memory device 20. For example, even though key information at a certain cycle is deciphered and a part of a content included in the memory information is acquired, the possibility that the whole information of the content is acquired can be reduced.

In the memory information protection system 1A, the information processing apparatus 10A and the memory device 20 separately generate the key information, and no exchange of key information is performed between the information processing apparatus 10A and the memory device 20. Therefore, the confidentiality of the key information can be more effectively ensured.

In the memory information protection system 1A, the key information is generated using the key generation parts 112 and 212 that are configured as hardware and the hardware keys 111 and 211, and the CPU does not participate in the generation of the key information. This makes it impossible to identify the key information by analyzing the program executed by the CPU. Therefore, the confidentiality of the key information can be more effectively ensured.

In the example described above, the key generation parts 112 and 212 have the shift part, and the shift part lets the key information shift to generate new key information. However, this is not limitative. To be specific, each of the key generation parts 112 and 212 may be configured to have an encryption circuit, perform the encryption using the stream encryption method or the block encryption method, and generate new key information based on the hardware keys 111 and 211.

Here, it can also be recognized that in a case where such a configuration is adopted, the key generation parts 112 and 212 and the data conversion circuits 113 and 213 execute a series of processing steps in which the key generation parts 112 and 212 apply first-stage encryption processing to the hardware keys 111 and 211 to thereby generate the key information while the data conversion circuits 113 and 213 apply second-stage encryption processing for encrypting a command using the key information.

[1-3. Operation of Memory Information Protection System 1A]

Figure 5:
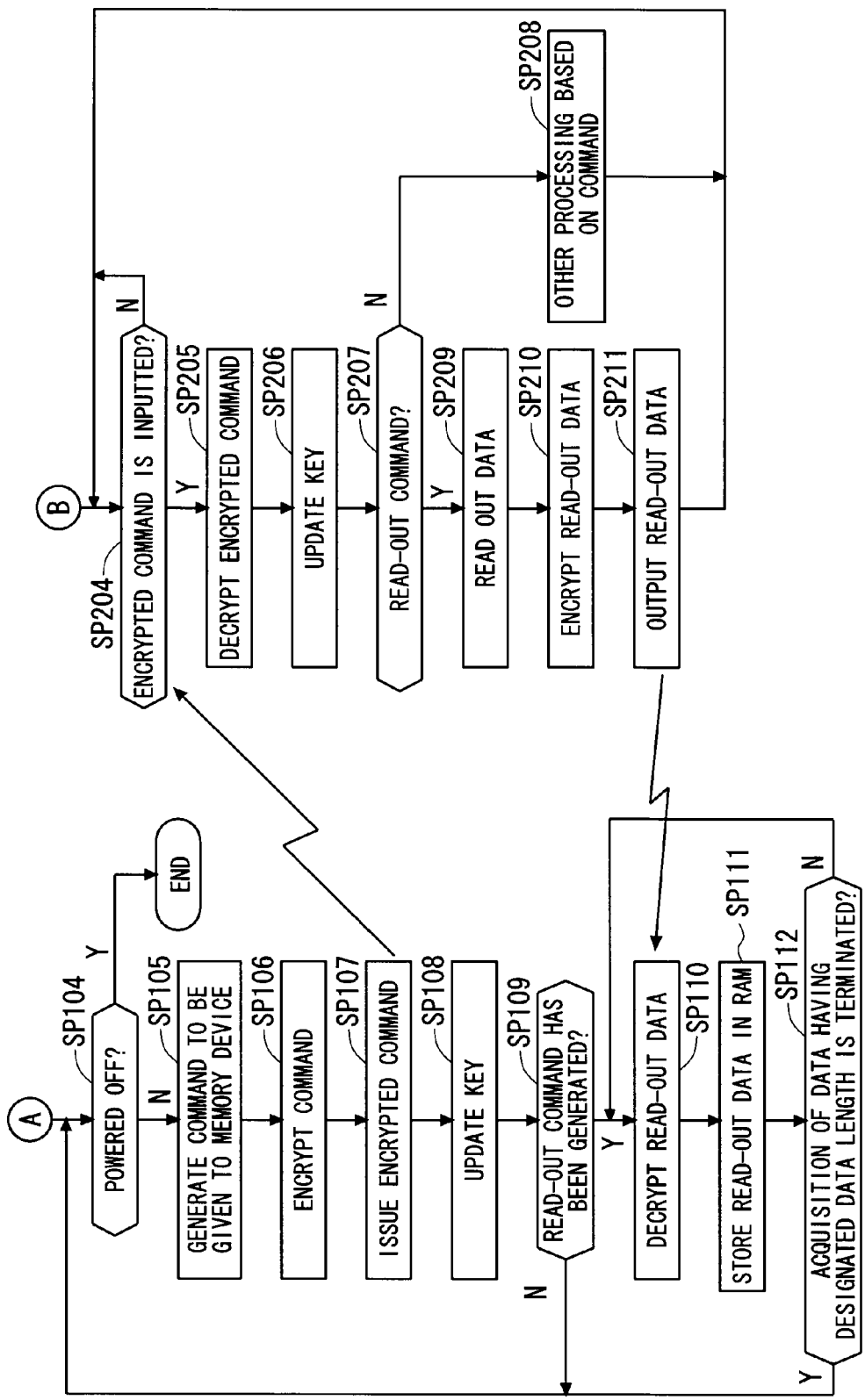
FIG. 5 is a flowchart showing the operation of the memory information protection system according to the first embodiment.

An operation of the memory information protection system 1A will be described. FIGS. 4 and 5 are flowcharts showing an operation of the memory information protection system 1A. In FIGS. 4 and 5, a flowchart showing an operation of the information processing apparatus 10A is shown left, and a flowchart showing an operation of the memory device 20 is shown right. Although the memory device 20 does not include any processing part such as a CPU and its operation is based on a circuit configured as hardware, here the operation is shown as a flow corresponding to an operation flow of the information processing apparatus 10A for descriptive purposes.

Before the memory information protection system 1A starts operating, the memory device 20 is mounted to the information processing apparatus 10A, and their interface parts 120 and 220 are electrically connected to each other. Then, in accordance with power-on of the information processing apparatus 10A, the information processing apparatus 10A is caused to start up and simultaneously power is supplied to the memory device 20, thus starting a system operation.

As shown in FIG. 4, in the information processing apparatus 10A, when powered on, the key generation part 112 is initialized in step SP101. In the initialization of the key generation part 112, initial key information is generated based on the hardware key 111.

In step SP102, the data conversion circuit 113 is initialized using the initial key information.

In step SP103, the command generation part 101 generates an initialization command, and the initialization command is issued to the memory device 20. After the initialization command is issued, the encryption and decryption function is activated (ON) in the data conversion circuit 113. Thereby, the data conversion circuit 113 is allowed to encrypt and decrypt data using the initial key information.

On the other hand, in the memory device 20, after the power supply is started, in step SP201, the command discrimination part 214 determines whether or not an initialization command has been inputted. Upon a detection of the input of the initialization command, the command discrimination part 214 gives an initialization instruction to the key generation part 212.

In step SP202, the key generation part 212 is initialized in accordance with the initialization instruction given from the command discrimination part 214, and initial key information is generated based on the hardware key 211.

In step SP203, the data conversion circuit 213 is initialized using the initial key information. Thereby, the data conversion circuit 213 is allowed to encrypt and decrypt data using the initial key information.

Then, in the information processing apparatus 10A, in step SP104, whether or not the information processing apparatus 10A has been powered off is determined, and if the information processing apparatus 10A has been powered off, the operation of the information processing apparatus 10A is terminated. If the information processing apparatus 10A is powered on, the operation process moves to step SP105.

In step SP105 (see FIG. 5), the command generation part 101 generates a command to be given to the memory device 20.

In step SP106, the command generated in the command generation part 101 is inputted to the data conversion circuit 113, and the data conversion circuit 113 encrypts the command using the initial key information. In a case of performing step SP106 again in repetitive processing, the command is encrypted using new key information.

In step SP107, the encrypted command encrypted by the data conversion circuit 113 is issued to the memory device 20 via the interface part 120.

When the command issue detection part 103 detects a command output from the command generation part 101, the command issue detection part 103 instructs the key generation part 112 to generate key information. Thereby, in step SP108, the key generation part 112 generates new key information, and the key information is updated in the data conversion circuit 113.

On the other hand, in the memory device 20, if the encrypted command is inputted in step SP204, the operation process moves to step SP205.

In step SP205, the encrypted command is decrypted using the initial key information.

The decrypted command is inputted to the command discrimination part 214, and then the command discrimination part 214 gives generation instruction of the key information to the key generation part 212. Thereby, in step SP206, the key generation part 212 generates new key information, and the key information is updated in the data conversion circuit 213.

In step SP207, the command discrimination part 214 determines whether or not the command given from the information processing apparatus 10A is a read-out command. If the command inputted from the information processing apparatus 10A is not a read-out command, the operation process moves to step SP208, and processing other than read-out processing is executed based on the inputted command.

If the command inputted from the information processing apparatus 10A is a read-out command, the process moves to step SP209, and data read-out processing is executed (step SP209 to step SP211).

More specifically, in step SP209, a read-out signal and read-out address data are given to the storage part 200, and data stored in the designated read-out address is read out from the storage part 200. Then, in step SP210, the data conversion circuit 213 encrypts the read-out data using new key information. In step SP211, the encrypted read-out data is outputted to the information processing apparatus 10A via the interface part 220.

In the information processing apparatus 10A, after the key information is updated in step SP108, the operation process moves to step SP109.

In step SP109, whether or not a read-out command has been generated in step SP105 is determined, and if the read-out command has not been generated, the process moves to step SP104, where the command generation processing and the like are executed again. If the read-out command has been generated, the process moves to step SP110, to execute reception processing for receiving read-out data from the memory device 20.

More specifically, after read-out data is inputted from the memory device 20, in step SP110, the data conversion circuit 113 decrypts the read-out data using the new key information generated in step SP108.

In step SP111, the data acquisition part 102 lets the read-out data stored in the RAM.

In step SP112, the data acquisition part 102 determines whether or not acquisition of the data having a designated data length has been terminated. If the acquisition of the read-out data has not been terminated, the processing of step SP110 to step SP112 is repeatedly executed until the acquisition of the data having the designated data length is terminated. If the acquisition of the data having the designated data length has been terminated, the process moves to step SP104, and as necessary, a new command is generated, to execute an operation in accordance with the new command.

As described above, the memory information protection system 1A includes the memory device 20 having predetermined information stored therein, and the memory control apparatus 10A corresponding to the memory device 20. The memory control apparatus 10A has the key generation part 112 that newly generates first key information used for the encryption and decryption of information at every predetermined timing, and the data conversion circuit 113 that encrypts information to be outputted to the memory device 20 based on the first key information and decrypts encrypted information inputted from the memory device 20 based on the first key information. In the data conversion circuit 113, each time the key generation part 112 generates new first key information, update of the key information is performed so as to set the new first key information as the key information. On the other hand, the memory device 20 has the key generation part 212 that newly generates second key information identical to the first key information in synchronization with the aforementioned predetermined timing, the storage part 200 having predetermined information stored therein, and the data conversion circuit 213 that encrypts a read-out object piece of the predetermined information based on the second key information and decrypts the encrypted information inputted from the memory control apparatus 10A based on the second key information. In the data conversion circuit 213, each time the key generation part 212 generates new second key information, update of the key information is performed so as to set the new second key information as the key information.

In such a memory information protection system 1A, the memory control apparatus 10A and the memory device 20 are allowed to perform the encryption and decryption using the common key information updated at every predetermined timing.

Therefore, the confidentiality of the predetermined information stored in the memory device 20 can be increased.

<2. Second Embodiment>

Next, a second embodiment of the present invention will be described. A memory information protection system 1B according to the second embodiment has a structure and functions substantially identical to those of the memory information protection system 1A, except that a random number generation part is provided. The common parts will be denoted by the same corresponding reference marks, and descriptions thereof will be omitted. FIG. 6 is a block diagram showing a functional configuration of the memory information protection system 1B according to the second embodiment.

As shown in FIG. 6, an information processing apparatus 10B of the memory information protection system 1B includes an overall control part 100B, a memory control part 110B similar to that of the first embodiment, and an interface part 120 similar to that of the first embodiment.

The overall control part 100B mainly includes a CPU, a RAM, a ROM, and the like, and functionally implements a random number generation part 104 and a control register part 105 in addition to the command generation part 101, the data acquisition part 102, and the command issue detection part 103.

The random number generation part 104 has a function of generating a random number value based on a pseudo random number generate algorithm at a time when the information processing apparatus 10B is caused to start up.

The random number value generated by the random number generation part 104 is transmitted to the command generation part 101. The command generation part 101 acquires the random number value, and then generates a command (also referred to as a "random number storing command") including the random number value. The random number value generated by the random number generation part 104 is transmitted to the key generation part 112 through the control register part 105.

The key generation part 112 of the memory control part 110B has an acquisition function (random number acquisition Dart) of acquiring a random number value from the overall control part 100B that is the outside of the memory control part 110B, and at a time of initialization, generates initial key information based on the hardware key 111 and the random number value.

Figure 7:
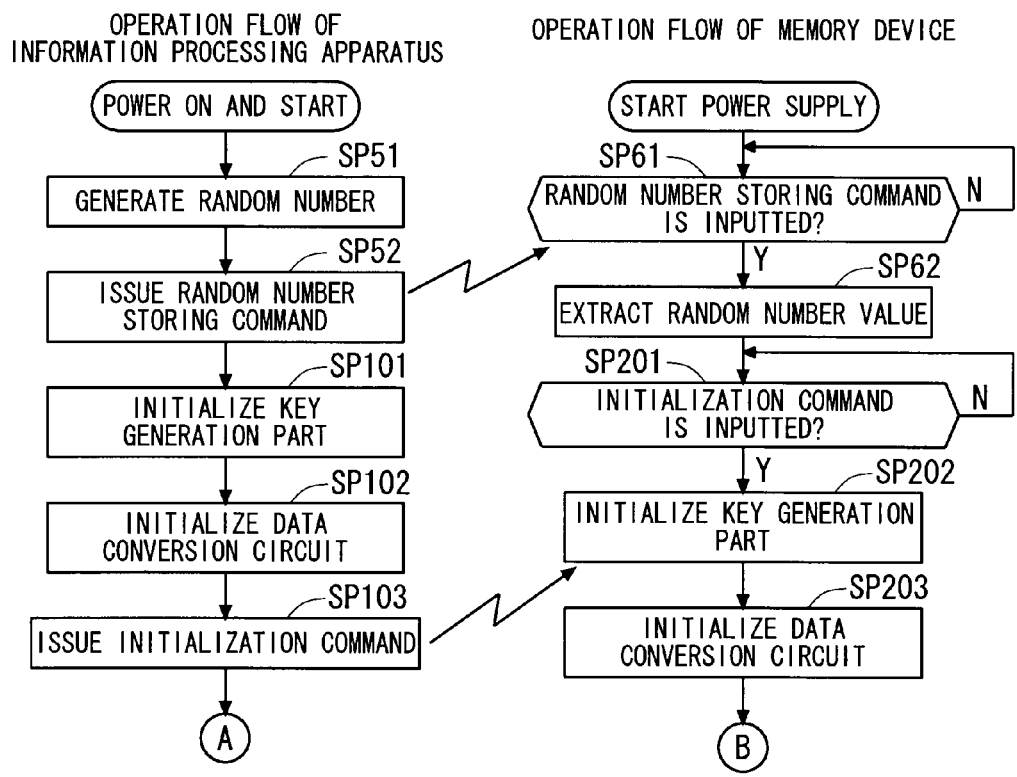
FIG. 7 is a flowchart showing an initial operation after start-up of the memory information protection system according to the second embodiment.

Here, an operation of the memory information protection system 1B will be described. FIG. 7 is a flowchart showing an initial operation after start-up of the memory information protection system 1B. In FIG. 7, a flowchart showing an operation of the information processing apparatus 10B is shown left, and a flowchart showing an operation of the memory device 20 is shown right.

The memory device 20 is mounted to the information processing apparatus 10B and the information processing apparatus 10B is powered on, and then a system operation starts.

More specifically, as shown in FIG. 7, in the information processing apparatus 10B, the random number generation part 104 generates a random number value in step SP51.

In subsequent step SP52, the command generation part 101 generates a random number storing command including a random number value, and issues the random number storing command to the memory device 20.

Then, in step SP101, the key generation part 112 is initialized, and initial key information is generated based on the hardware key 111 and the random number value.

In step SP102, the data conversion circuit 113 is initialized using the initial key information.

In step SP103, the command generation part 101 generates an initialization command, and the initialization command is issued to the memory device 20. After the initialization command is issued, the encryption and decryption function is activated (ON) in the data conversion circuit 113. Thereby, the data conversion circuit 113 is allowed to encrypt and decrypt data using the initial key information.

On the other hand, in the memory device 20, after the power supply is started, in step SP61, whether or not a random number storing command has been inputted is determined by the command discrimination part 214. If the command discrimination part 214 determines that a random number storing command has been inputted, the operation process moves to step SP62.

In step SP62, the command discrimination part 214 extracts a random number value from the random number storing command, and transmits the random number value to the key generation part 212.

In subsequent step SP201, the command discrimination part 214 determines whether or not an initialization command has been inputted. If the command discrimination part 214 determines that an initialization command has been inputted, the operation process moves to step SP202.

In step SP202, the key generation part 212 is initialized, and initial key information is generated based on the hardware key 211 and the random number value.

In step SP203, the data conversion circuit 213 is initialized using the initial key information. Thereby, the data conversion circuit 213 is allowed to encrypt and decrypt data using the initial key information.

In the information processing apparatus 10B and the memory device 20, after the above-described initial operation is terminated, the same operations as those of the information processing apparatus 10A and the memory device 20 of the first embodiment, respectively operation (see FIG. 5) are performed.

As described above, in the memory information protection system 1B, each of the information processing apparatus 10B and the memory device 20 generates the first initial key information based on the common random number value. This can avoid generating the same initial key information upon each start-up, and make it more difficult for third parties to identify the hardware keys 111 and 211.

In a case where the key generation parts 112 and 212 are configured to have encryption circuits and to generate key information by performing encryption in the stream encryption method or the block encryption method, new key information is generated based on the hardware key 111 and the random number value by this encryption in the key generation parts 112 and 212.

<3. Third Embodiment>

Next, a third embodiment of the present invention will be described with reference to the drawings.

[3-1. Outline of Configuration]

Figure 9:
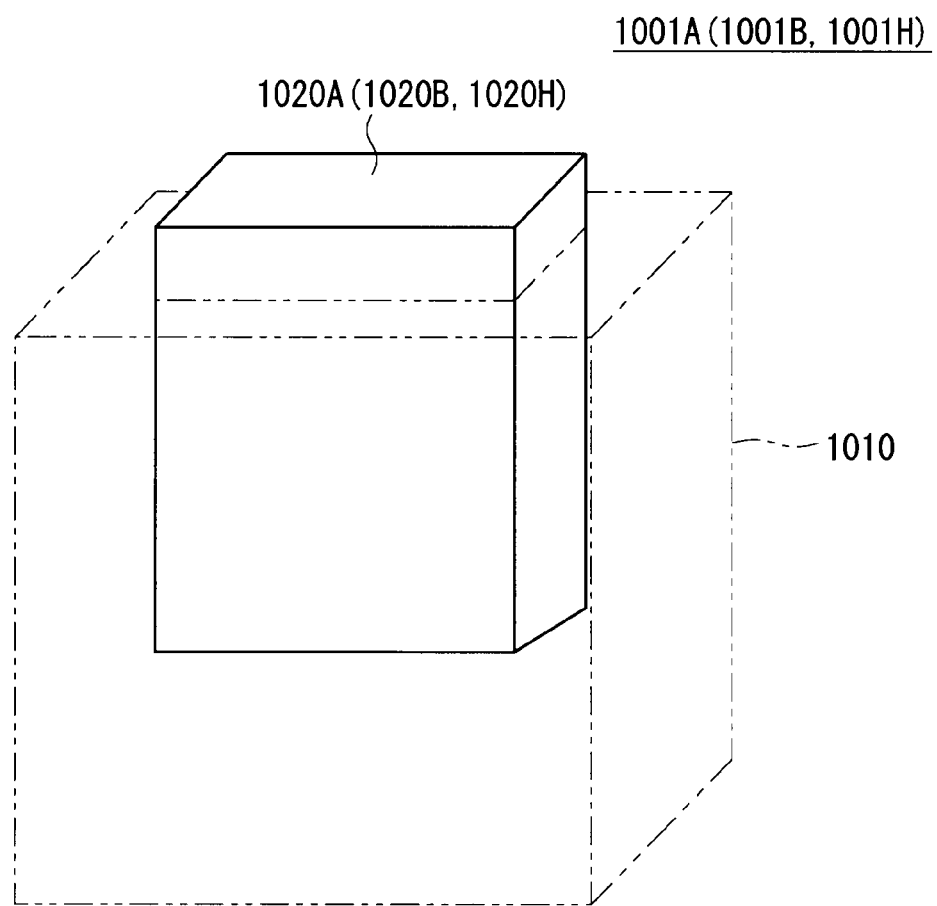
FIG. 9 is a diagram showing a configuration of an external appearance of a memory information protection system.

FIG. 9 is a diagram showing a configuration of an external appearance of a memory information protection system 1001A.

As shown in FIG. 9, the memory information protection system 1001A includes an information processing apparatus 1010 and a memory device 1020A.

The memory device 1020A stores information (also referred to as "memory information" or "stored information") such as a program, data, and/or the like in a memory array such as a universal mask ROM. Examples of the memory information include data of application software executable by the information processing apparatus 1010 that is one type of a computer equipment, and/or data for use in the application software. The memory device 1020A is in the form of a card or a cartridge, for example, and removably mounted to the information processing apparatus 1010 that is an external apparatus of the memory device 1020A. The memory device 1020A is used while being mounted to the information processing apparatus 1010.

Examples of the information processing apparatus 1010 that uses the memory information stored in the memory device 1020A include a portable information terminal device such as a personal computer (PC) and a PDA (Personal Digital Assistant), and an image processing apparatus.

In the memory information protection system 1001A, when a command (encrypted command) as encrypted input information is supplied from the information processing apparatus 1010 to the memory device 1020A, the memory device 1020A decrypts the encrypted command and executes processing designated by the command.

[3-2. Functional Block]

Next, a detailed description will be given of functions of the memory information protection system 1001A. FIG. 10 is a block diagram showing a functional configuration of the memory information protection system 1001A according to the third embodiment.

As shown in FIG. 10, the information processing apparatus 1010 included in the memory information protection system 1001A generates a command including a predetermined instruction and an address, and encrypts the command and outputs a resulting command to the outside. The encrypted command is given to the memory device 1020A, and thereby the information processing apparatus 1010 controls reading out and writing in of data from and to the memory device 1020A. In particular, in a case where the information processing apparatus 1010 reads out predetermined data from the memory device 1020A, the information processing apparatus 1010 generates a command including a read-out instruction and an address of data that is a read-out object. The information processing apparatus 1010 encrypts the command, and outputs a resulting comment to give it to the memory device 1020A. This encryption is performed in a preset method, and key information for the decryption thereof is generated at the memory device 1020A side.

The memory device 1020A included in the memory information protection system 1001A includes a storage part 1200 an in-memory control part 1210A, and an interface part 1220.

The storage part 1200 is a nonvolatile memory such as a mask ROM, and stores therein a program, data, and/or the like, whose confidentiality is to be ensured or which is to be protected from unauthorized reading. The storage part 1200 is not limited to a mask ROM, but may be a flash memory, an EP-ROM, a hard disk (HD), or the like.

The in-memory control part 1210A includes a hardware key 1211, a key generation part 1212A, a data conversion circuit (data conversion part) 1213, and a command discrimination part (instruction part) 1214.

The hardware key 1211 is static data mounted on a chip in the form of hardware. The hardware key 1211 can be implemented by, for example, using a plurality of inverters (NOT circuits) corresponding to a bit length of the hardware key 111 and clamping an input of each inverter to a power supply voltage (Vcc) or a GND (ground potential).

The key generation part 1212A has a function of newly generating key information used for the encryption and decryption of information by executing computation processing at every predetermined timing. To be specific, when the initialization command issued by the information processing apparatus 1010 after the information processing apparatus 1010 is powered on is detected, the key generation part 1212A generates initial key information based on the hardware key 1211 (initialization of the key generation part 1212A). The key generation part 1212A is configured to have a shift part for shifting a bit string that forms the key information, and lets the initial key information shift sequentially in accordance with a key generation instruction given from the command discrimination part 1214, thereby generating new key information.

For example, a shift register is adoptable as the shift part. In a case where the shift register is adopted as the shift part, the key generation part 1212A may be configured such that, upon reception of each key generation instruction, a clock can be inputted to the shift register and a bit string of the hardware key 1211 can be sequentially inputted to the shift register in accordance with an input of the clock.

For the generation of the initial key information, for example, a pseudo random number generating circuit is adoptable. In a case where the key generation part 1212A is configured to have the pseudo random number generating circuit, the pseudo random number generating circuit generates a pseudo random number based on the hardware key 1211 and the generated pseudo random number is used as the initial key information.

The data conversion circuit 1213 has a function of decrypting an encrypted command by applying, to the encrypted command received via the interface part 1220, predetermined computation processing using the key information generated by the key generation part 1212A. The command decrypted by the data conversion circuit 1213 is supplied to the command discrimination part 1214. For example, a stream encryption method or a block encryption method is adoptable as an encryption method.

The data conversion circuit 1213 also has a function of generating encrypted data by encrypting data read out from the storage part 1200 using the key information generated by the key generation part 1212A. The encrypted data encrypted by the data conversion circuit 1213 is supplied to the information processing apparatus 1010 via the interface part 1220.

The command discrimination part 1214 discriminates the decrypted input information (here, the command), and gives execution instruction of a predetermined operation in accordance with the input information. For example, in a case where the input information given from the information processing apparatus 1010 and decrypted by the data conversion circuit 1213 includes a read-out command for reading out data from the storage part 1200, the command discrimination part 1214 extracts a read-out order code and read-out address data from the read-out command, and gives a read-out instruction signal (read-out signal) and the read-out address data to the storage part 1200.

The command discrimination part 1214 also functions as an instruction part for giving generation instruction of key information to the key generation part 1212A in accordance with a detection of the read-out command.

The key generation instruction signal is outputted from the command discrimination part 1214, and then the key generation part 1212A generates new key information. After the key generation part 1212A generates the new key information, in the data conversion circuit 1213 for encrypting and decrypting information, update of the key information is performed so as to set the generated new key information as key information used for the encryption and decryption.

In this manner, in the memory device 1020A, key generation processing in the key generation part 1212A and key information update processing in the data conversion circuit 1213 are sequentially executed in accordance with the key generation instruction that is in synchronization with reception of the read-out command. As a result, a series of processing steps (also referred to as "key update processing") executed in the key generation part 1212A and the data conversion circuit 1213 are executed within a wait time (also referred to as a "read-out time period" or a "latency time period") for reading out data from the storage part 1200. This can prevent a reduction in the throughput of the information processing apparatus 1010 and the memory information protection system 1001A which may otherwise be caused by an increase in the processing time required for the key update processing.

In the example described above, key generation part 1212A has the shift part, and the shift part lets the key information shift to generate new key information. However, this is not limitative. To be specific, the key generation part 1212A may be configured to have an encryption circuit, encrypt the hardware key 1211 using the stream encryption method or the block encryption method, and generate new key information.

Here, it can also be recognized that in a case where such a configuration is adopted, the key generation part 1212A and the data conversion circuit 1213 execute a series of processing steps in which the key generation part 1212A applies first-stage encryption processing to the hardware key 1211 to thereby generate the key information while the data conversion circuit 1213 applies second-stage encryption processing for encrypting a command using the key information.

[3-3. Operation of Memory Device 1020A]

Figure 11:
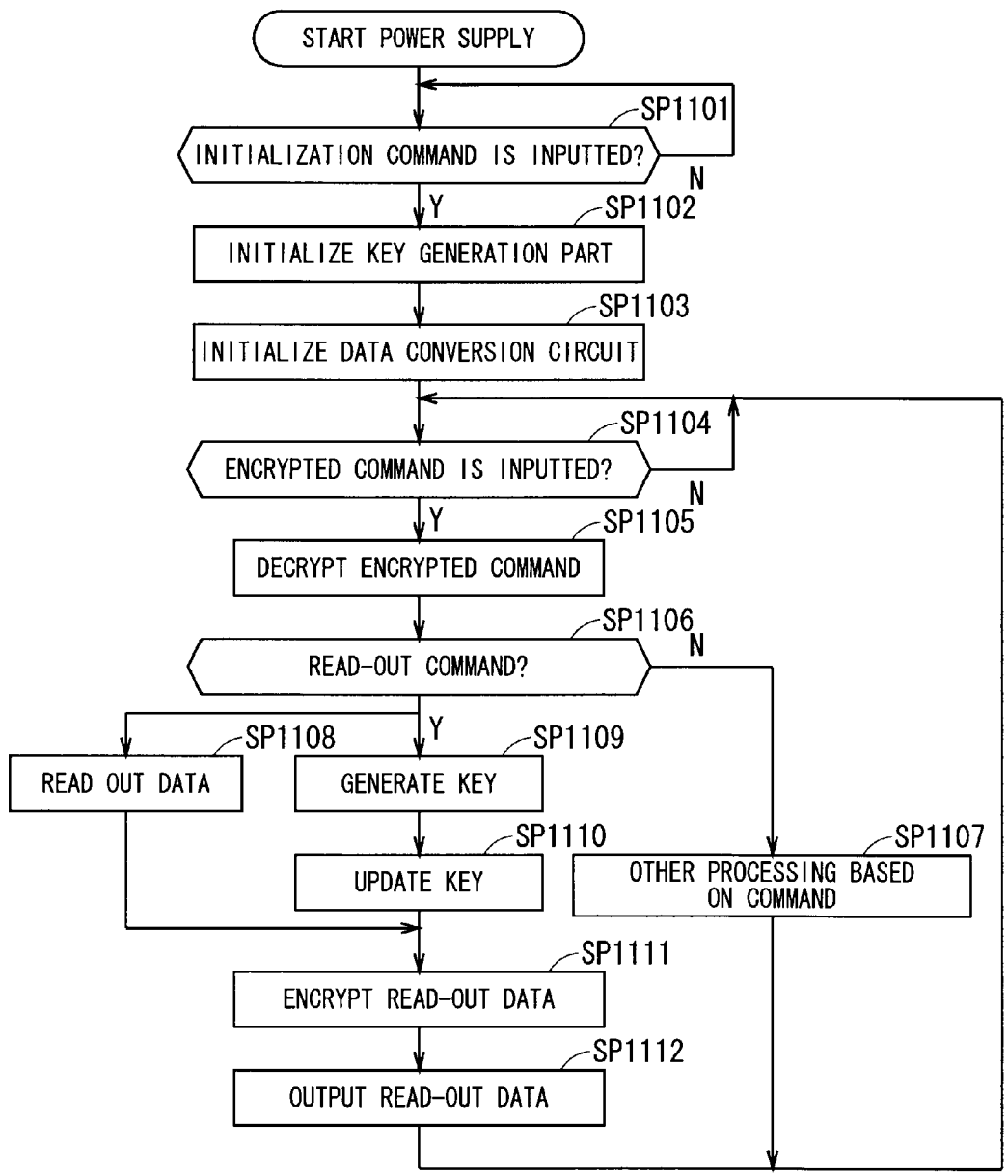
FIG. 11 is a flowchart showing an operation of a memory device.

Next, an operation of the memory device 1020A will be described. FIG. 11 is a flowchart showing an operation of the memory device 1020A. Although the memory device 1020A does not include any processing part such as a CPU and its operation is based on a circuit configured as hardware, here the operation is shown as a flow for descriptive purposes.

The memory device 1020A is mounted to the information processing apparatus 1010, and thereby electrically connected to the information processing apparatus 1010 via the interface part 1220. In accordance with power-on of the information processing apparatus 1010, the information processing apparatus 1010 is caused to start up, to supply power to the memory device 1020A, thus starting the operation of the memory device 1020A.

As shown in FIG. 11, after the power supply to the memory device 1020A starts, in step SP1101, the command discrimination part 1214 determines whether or not an initialization command has been inputted. Upon a detection of the input of the initialization command, the command discrimination part 1214 gives an initialization instruction to the key generation part 1212A.

In step SP1102, the key generation part 1212A is initialized in accordance with the initialization instruction given from the command discrimination part 1214, and initial key information is generated based on the hardware key 1211.

In step SP1103, the data conversion circuit 1213 is initialized using the initial key information. Thereby, the data conversion circuit 1213 is allowed to encrypt and decrypt data using the initial key information.

On the other hand, in the memory device 1020A, if the encrypted command is inputted in step SP1104, the operation process moves to step SP1105.

In step SP1105, the data conversion circuit 1213 decrypts the encrypted command using the initial key information.

In step SP1106, the command discrimination part 1214 discriminates the decrypted command, and determines whether or not the command given from the information processing apparatus 1010 is a read-out command. If the command inputted from the information processing apparatus 1010 is not a read-out command, the command discrimination part 1214 gives execution instruction of a predetermined operation in accordance with the command, and the operation process moves to step SP1107, where processing other than read-out processing is executed based on the inputted command.

On the other hand, the command inputted from the information processing apparatus 1010 is a read-out command, the command discrimination part 1214 gives a read-out instruction signal and read-out address data to the storage part 1200, and gives generation instruction of key information to the key generation part 1212A. As a result, in the memory device 1020A, the data read-out processing in accordance with the read-out instruction and a series of key update processing in accordance with the generation instruction of the key information are concurrently executed.

Firstly, the data read-out processing executed in the storage part 1200 will be described.

The read-out instruction signal is given, and then the operation process moves to step SP1108, where the data read-out processing for reading the data that is a read-out object is executed in the storage part 1200. After the data read-out processing is started, a signal (also referred to as a "read-out start signal") indicating that the data read-out processing is in execution in the storage part 1200 is transmitted from the storage part 1200 to the data conversion circuit 1213. After the data read-out processing is completed in the storage part 1200, a signal (also referred to as a "read-out completion signal") indicating that the data read-out processing has been completed is transmitted from the storage part 1200 to the data conversion circuit 1213. In this manner, in the data conversion circuit 1213, the commencement and the termination of the wait time (latency time period) for reading out data can be recognized based on the read-out start signal and the read-out completion signal inputted from the storage part 1200.

Next, the series of key update processing steps executed in the key generation part 1212A and the data conversion circuit 1213 will be described.

After the generation instruction of the key information is given from the command discrimination part 1214 to the key generation part 1212A, the operation process moves to step SP1109, where the key generation part 1212A generates new key information.

After the new key information is generated, the operation process moves to step SP1110, where the data conversion circuit 1213 is initialized using the new key information, and the key information is updated. If the data conversion circuit 1213 is initialized so that the key information is updated, the data conversion circuit 1213 is allowed to perform the encryption and decryption using the new key information.

Such a series of key update processing steps (step SP1109 and step SP1110) are executed in the latency time period for reading out data.

In step SP1111 coming after the latency time period is terminated, the data conversion circuit 1213 encrypts the data read out from the storage part 1200 by using the updated key information.

In step SP1112, the encrypted read-out data is outputted to the information processing apparatus 1010 via the interface part 1220.

As described above, the memory device 1020A includes the storage part 1200 that stores information therein, the key generation part 1212A that generates key information for use in the encryption and decryption of information, the data conversion circuit 1213 that encrypts output information to be outputted to the information processing apparatus 1010 serving as an external apparatus based on the key information and decrypts encrypted input information inputted from the information processing apparatus 1010 based on the key information, and the command discrimination part 1214 that discriminates the input information and gives execution instruction of a predetermined operation in accordance with the input information. In a case where a read-out command for reading information from the storage part 1200 is included in the input information, the command discrimination part 1214 gives generation instruction of key information to the key generation part 1212A and gives a read-out instruction to the storage part 1200 in accordance with the read-out command. The key generation part 1212A generates new key information in accordance with the generation instruction given from the command discrimination part 1214, in the read-out time period for reading out predetermined information from the storage part 1200 in accordance with the read-out instruction.

In such a memory device 1020A, the series of key update processing steps associated with the encryption of the information outputted from the memory device 1020A are executed in the read-out time period for reading out data from the storage part 1200. This can reduce the throughput of an external apparatus (here, the information processing apparatus 1010) that uses the information stored in the memory device.

<4. Fourth Embodiment>

Figure 12:
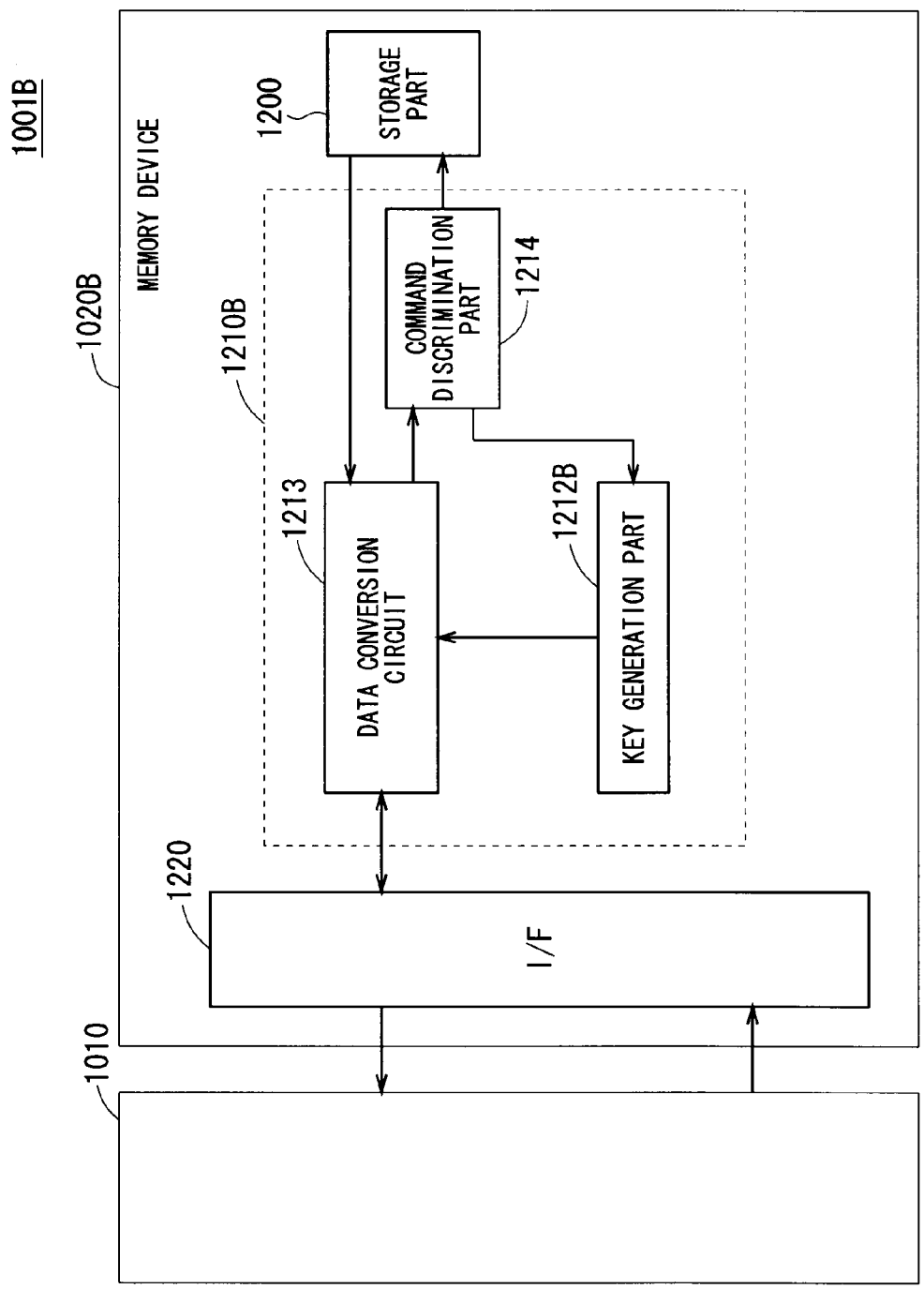
FIG. 12 is a block diagram showing a functional configuration of a memory information protection system according to a fourth embodiment.

Next, a fourth embodiment of the present invention will be described. A memory information protection system 1001B according to the fourth embodiment has a structure and functions substantially identical to those of the memory information protection system 1001A, except that the hardware key 1211 is not provided. The common parts will be denoted by the same corresponding reference marks, and descriptions thereof will be omitted. FIG. 12 is a block diagram showing a functional configuration of the memory information protection system 1001B according to the fourth embodiment.

As shown in FIG. 12, a memory device 1020B of the memory information protection system 1001B includes the storage part 1200, an in-memory control part 1210B, and the interface part 1220.

The in-memory control part 1210B has a key generation part 1212B, a data conversion circuit 1213, and a command discrimination part 1214.

The key generation part 1212B has a function of newly generating key information used for the encryption and decryption of information by executing computation processing at every predetermined timing. For example, the key generation part 1212B is configured to have a pseudo random number generating circuit, and the key information is generated in the key generation part 1212B, not by a hardware key or the like. In a case where the key generation part 1212B is configured to have a pseudo random number generating circuit, the pseudo random number generating circuit generates a pseudo random number in accordance with a key generation instruction given from the command discrimination part 1214, and the generated pseudo random number is used as the key information. In this manner, in the key generation part 1212B, each time the key generation instruction is received, new key information is generated.

The data conversion circuit 1213 has a function of decrypting an encrypted command by applying, to the encrypted command received via the interface part 1220, predetermined computation process using the key information generated by the key generation part 1212B. The command decrypted by the data conversion circuit 1213 is supplied to the command discrimination part 1214. For example, a stream encryption method or a block encryption method is adoptable as an encryption method.

The data conversion circuit 1213 also has a function of generating encrypted data by encrypting data read out from the storage part 1200 using the key information generated by the key generation part 1212B. The encrypted data encrypted by the data conversion circuit 1213 is supplied to the information processing apparatus 1010 via the interface part 1220.

The command discrimination part 1214 discriminates the decrypted command, and gives execution instruction of a predetermined operation in accordance with the command. For example, in a case where the command given from the information processing apparatus 1010 and decrypted by the data conversion circuit 1213 is a read-out command for reading out data from the storage part 1200, the command discrimination part 1214 extracts a read-out order code and read-out address data from the read-out command, and gives a read-out instruction signal (read-out signal) and the read-out address data to the storage part 1200.

The command discrimination part 1214 also functions as an instruction part for giving generation instruction of key information to the key generation part 1212B in accordance with a detection of the read-out command.

The key generation instruction signal is outputted from the command discrimination part 1214 based on the reception of the read-out command, and then the key generation part 1212B generates new key information. After the key generation part 1212B generates the new key information, the data conversion circuit 1213 that encrypts and decrypts information updates the key information using the generated new key information.

In this manner, in the memory device 1020B, key generation processing in the key generation part 1212B and key information update processing in the data conversion circuit 1213 are sequentially executed in accordance with the key generation instruction that is in synchronization with reception of the read-out command. As a result, a series of key update processing steps executed in the key generation part 1212B and the data conversion circuit 1213 are executed within a latency time period for reading out data from the storage part 1200. This can prevent a reduction in the throughput of the memory information protection system 1001B which may otherwise be caused by an increase in the processing time required for the key update processing.

<5. Modification>

Although some embodiments of the present invention have been described above, the present invention is not limited to the description given above.

For example, although the first and second embodiments described above illustrate the case where the information processing apparatus 10A, 10B and the memory device 20 have common hardware configurations for generating a key, this is not limitative. To be more specific, the information processing apparatus 10A, 10B and the memory device 20 may have different hardware configurations for generating a key, as long as they can generate common key information.

Figure 8:
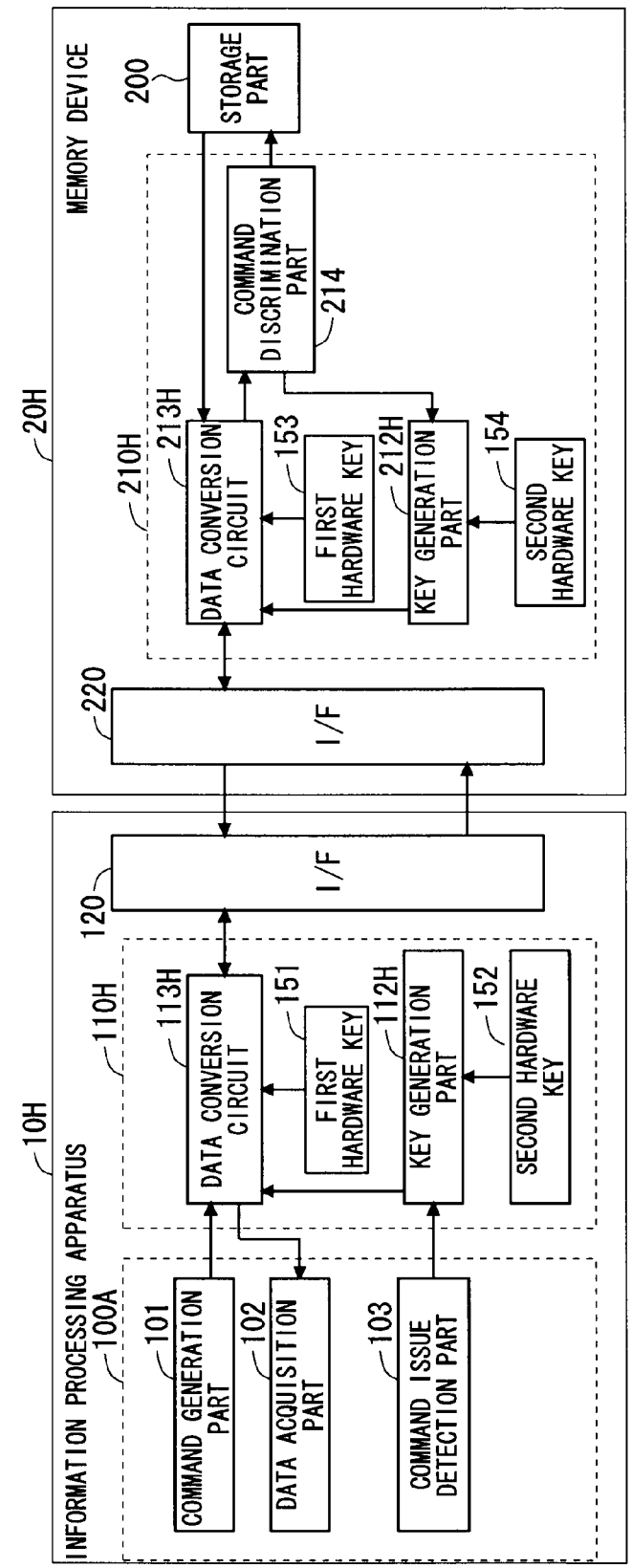
FIG. 8 is a block diagram showing a functional configuration of a memory information protection system according to a modification.

Although the first and second embodiments described above illustrate the case where the information processing apparatus 10A, 10B and the memory device 20 have one hardware key 111 and one hardware key 211, respectively, this is not limitative. To be more specific, a plurality of hardware keys may be provided. FIG. 8 is a block diagram showing a functional configuration of a memory information protection system 1H according to a modification.

For example, as shown in FIG. 8, a memory control part 110H of the memory information protection system 1H includes a first hardware key 151, a second hardware key 152, a key generation part 112H, and a data conversion circuit 113H.

In the key generation part 112H, at a time of initialization, initial key information is generated based on the second hardware key 152. After the initial key information is generated, the initial key information is sequentially shifted in accordance with a key generation instruction, to thereby generate new key information.

In the data conversion circuit 113H, the data conversion circuit 113H is initialized based on the first hardware key 151 and the key information generated by the key generation part 112, and the key information used for the encryption and decryption is updated.

An in-memory control part 210H of the memory information protection system 1H also includes a first hardware key 153, a second hardware key 154, a key generation part 212H, and a data conversion circuit 213H.

In the key generation part 212H, at a time of initialization, initial key information is generated based on the second hardware key 154. After the initial key information is generated, the initial key information is sequentially shifted in accordance with a key generation instruction, to thereby generate new key information.

In the data conversion circuit 213H, the data conversion circuit 213H is initialized based on the first hardware key 153 and the key information generated by the key generation part 212H, and the key information used for the encryption and decryption is updated.

In this manner, in the memory information protection system 1H, each of the information processing apparatus 10H and the memory device 20H uses two hardware keys to generate key information used for the encryption and decryption. This can make it more difficult for third parties to identify the hardware key.

Although the random number generation part 104 according to the second embodiment adopts, as the random number value, the pseudo random number generated based on a computer algorithm, this is not limitative. A true random number generated based on a physical phenomenon or the like may be adopted as the random number value.

For example, although the third and fourth embodiments described above illustrate the case where the key generation processing in the key generation part 1212A, 1212B and the key information update processing in the data conversion circuit 1213 are sequentially executed in the latency time period, this is not limitative. Specifically, either one of the processing (the key generation processing or the key information update processing) may be executed in the latency time period. Such a configuration can also reduce the throughput of the information processing apparatus 1010.

If a configuration is adopted in which the key generation processing is not executed but the key information update processing is executed in the latency time period, the key information update processing may be started in accordance with reception of the read-out start signal from the storage part 1200.

Figure 13:
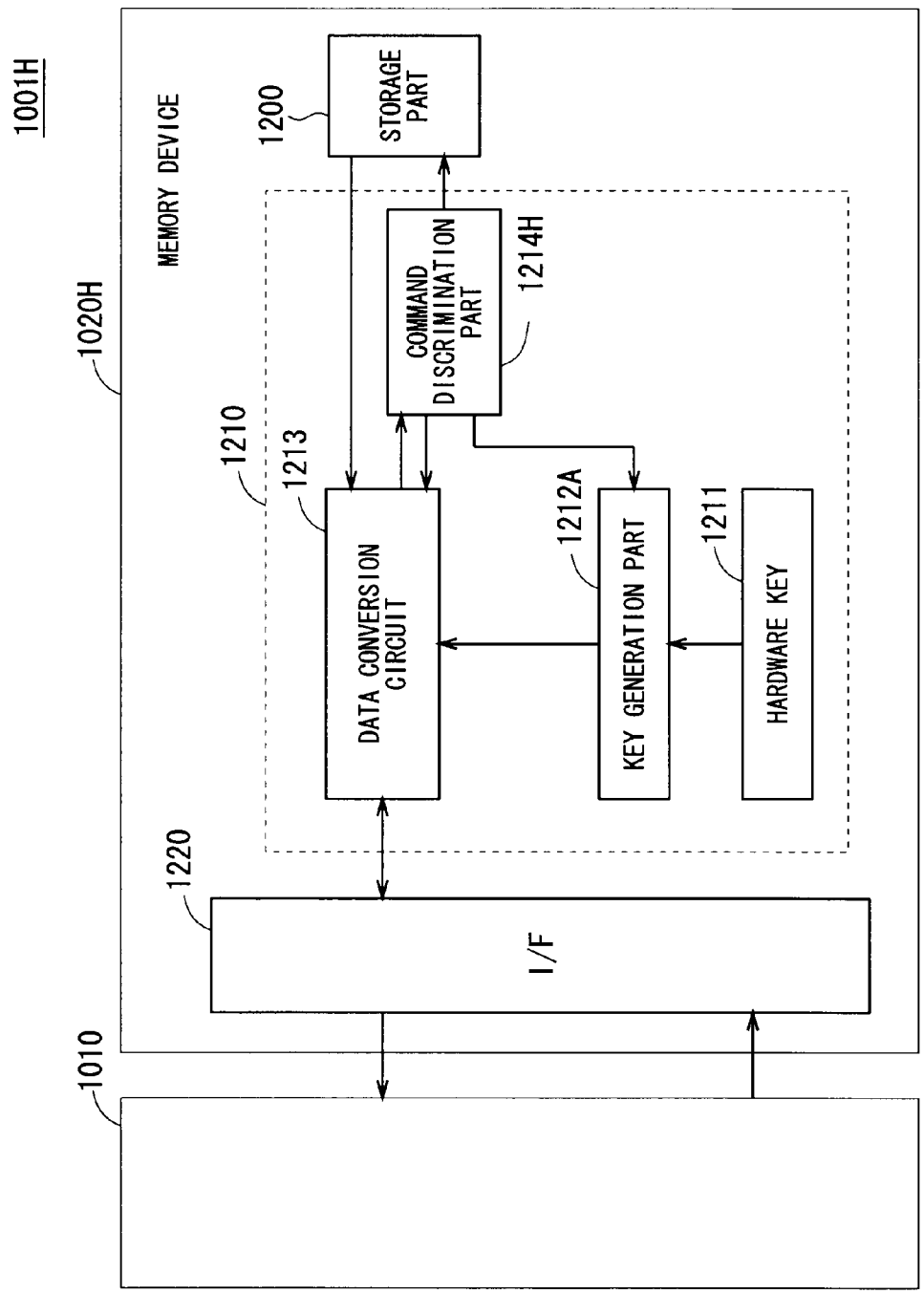
FIG. 13 is a block diagram showing a functional configuration of a memory information protection system according to a modification.

If a configuration is adopted in which the key generation processing is not executed but the key information update processing is executed in the latency time period, the key information update processing in the data conversion circuit 1213 may be executed in accordance with an instruction given from the command discrimination part 1214. FIG. 13 is a block diagram showing a functional configuration of a memory information protection system 1001H according to the modification.

More specifically, a command discrimination part 1214H of a memory device 1020H shown in FIG. 13 has a function of giving update instruction of key information to the data conversion circuit 1213 in accordance with a detection of a read-out command. In a case where such a memory device 1020H is adopted, the key information update processing is started in accordance with key information update instruction given from the command discrimination part 1214H serving as an instruction part The third and fourth embodiments described above illustrate the case where, in one latency time period, the key generation part 1212A, 1212B generates new key information, and then the data conversion circuit 1213 executes the key information update processing using the new key information. However, this is not limitative.

More specifically, the order of executing the key generation processing and the key information update processing in one latency time period may be reversed, or alternatively they may be executed concurrently (in parallel).

For example, in a case where the order of executing the two processing steps is reversed, that is, in a case where the key generation processing is executed after the key information update processing is executed, the data conversion circuit 1213 starts the key information update processing in accordance with reception of the read-out start signal from the storage part 1200, and after the update processing is terminated, new key information is generated in the key generation part 1212A, 1212B.

In a case of concurrently executing the two processing steps, the key generation part 1212A, 1212B may start the key generation processing in accordance with the key generation instruction from the command discrimination part 1214, while the data conversion circuit 1213 may start the key information update processing in accordance with reception of the read-out start signal from the storage part 1200.

In a case where the key generation processing is executed after the key information update processing is executed as in the modification, and in a case where the key information update processing and the key generation processing are executed concurrently, as the new key information for use in the key information update processing, the key information generated in the previous latency time period is adopted.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 1A, 1B, 1H memory information protection system
10A, 10B, 10H information processing apparatus
20, 20H memory device
100A, 100B overall control part
101 command generation part
102 data acquisition part
103 command issue detection part
104 random number generation part
105 control register part
110A, 110B, 110H memory control part
111, 211 hardware key
112, 212, 112H, 212H key generation part
113, 213, 113H, 213H data conversion circuit
120, 220 interface part
200 storage part
210, 210H in-memory control part
214 command discrimination part
D1, D2 read-out data
K1, K2, K3 key information
1001A, 1001B, 1001H memory information protection system
1010 information processing apparatus
1020A, 1020B, 1020H memory device
1200 storage part
1210A, 1210B in-memory control part
1211 hardware key
1212A, 1212B key generation part
1213 data conversion circuit
1214 command discrimination part
1220 interface part

The invention claimed is:

1. A memory controller comprising:
a key generation part configured to newly generate key information for use in encryption and decryption of information at every predetermined timing;
a data conversion part configured to encrypt information to be outputted to a memory device based on said key information, and decrypt encrypted predetermined information inputted from said memory device based on said key information;
a fixed hardware key implemented as hardware; and
a random number acquisition part configured to acquire a random number value generated outside,
wherein, in said data conversion part, each time said key generation part generates new key information, key information is updated so as to set said new key information as said key information,
wherein said key generation part generates initial key information at a time when said memory controller is started up,
wherein said key generation part includes a shift part configured to shift a bit string that forms said key information at said every predetermined timing to thereby generate said new key information,
wherein said key generation part generates said initial key information using said hardware key and said random number value, and
wherein said new key information is acquired by sequentially shifting a bit string that forms said initial key information at said every predetermined timing.

2. The memory controller according to claim 1, wherein said shift part includes a shift register.

3. The memory controller according to claim 1, wherein said key generation part generates said new key information using a stream encryption method or a block encryption method at said every predetermined timing.

4. The memory controller according to claim 3, wherein said key generation part performs encryption by said stream encryption method or said block encryption method, and generates said key information based on said hardware key.

5. The memory controller according to claim 3, wherein said key generation part performs encryption by said stream encryption method or said block encryption method, and generates said key information based on said hardware key and said random number value.

6. A memory control apparatus including the memory controller according to claim 1.

7. A memory device comprising:
an instruction part configured to give generation instruction of key information for use in encryption and decryption of information at every predetermined timing;
a key generation part configured to newly generate said key information in accordance with said generation instruction;
a storage part storing predetermined information therein;
a data conversion part configured to encrypt a read-out object piece of said predetermined information based on said key information, and decrypt encrypted information inputted from an external apparatus based on said key information; and
a fixed hardware key implemented as hardware,
wherein, in said data conversion part, each time said key generation part generates new key information, key information is updated so as to set said new key information as said key information, wherein said instruction part gives initialization instruction of said key generation part in accordance with an input of an initialization command from said external apparatus, wherein said key generation part generates initial key information in accordance with said initialization instruction, wherein said key generation part includes a shift part configured to shift a bit string that forms said key information at said every predetermined timing to thereby generate said new key information, wherein said memory device acquires a random number value generated in said external apparatus, wherein said key generation part generates said initial key information using said hardware key and said random number value, and wherein said new key information is acquired by sequentially shifting a bit string that forms said initial key information in accordance with said generation instruction.

8. The memory device according to claim 7, wherein said shift part includes a shift register.

9. The memory device according to claim 7, wherein said key generation part generates said new key information using a stream encryption method or a block encryption method at said every predetermined timing.

10. The memory device according to claim 9, wherein said key generation part performs encryption by said stream encryption method or said block encryption method, and generates said key information based on said hardware key.

11. The memory device according to claim 9, wherein said key generation part performs encryption by said stream encryption method or said block encryption method, and generates said key information based on said hardware key and said random number value.

12. The memory device according to claim 7, wherein said instruction part gives said generation instruction in accordance with an input of a command from said external apparatus.

13. A memory information protection system comprising:
a memory device storing predetermined information therein; and
a memory control apparatus associated with said memory device,
wherein
said memory control apparatus includes:
  a first key generation part configured to newly generate first key information for use in encryption and decryption of information at every predetermined timing; and
  a first data conversion part configured to encrypt information to be outputted to said memory device based on said first key information, and decrypt encrypted information inputted from said memory device based on said first key information, wherein
  in said first data conversion part, each time said first key generation part generates new first key information, key information is updated so as to set said new first key information as said first key information, and
  said key generation part generates initial key information at a time when said memory control apparatus is started up, and
said memory device includes:
  a second key generation part configured to newly generate second key information identical to said first key information, in synchronization with said every predetermined timing;
  a storage part storing predetermined information therein; and
  a second data conversion part configured to encrypt a read-out object piece of said predetermined information based on said second key information, and decrypt encrypted information inputted from said memory control apparatus based on said second key information, wherein
  in said second data conversion part, each time said second key generation part generates new second key information, key information is updated so as to set said new second key information as said second key information.

14. A control method for a memory control apparatus, comprising the steps of:
(a) newly generating, by said memory control apparatus, key information for use in encryption and decryption of information at every predetermined timing;
(b) encrypting information, by said memory control apparatus, to be outputted to an external apparatus based on said key information, and decrypting, by said memory control apparatus, encrypted information inputted from said external apparatus based on said key information;
(c) acquiring, by said memory control apparatus, a fixed hardware key implemented as hardware;
(d) acquiring, by said memory control apparatus, a random number value generated outside,
wherein, in said step (b), each time new key information is generated in said step (a), key information is updated so as to set said new key information as said key information,
wherein, in said step (a), generating key information includes generating initial key information at a time when said memory control apparatus is started up,
wherein said step (a) includes shifting a bit string that forms said key information at said every predetermined timing to thereby generate said new key information,
wherein, in said step (a), said initial key information is generated using said hardware key and said random number value, and
wherein said new key information is acquired by sequentially shifting a bit string that forms said initial key information at said every predetermined timing.

15. A memory device comprising:
a storage part storing predetermined information therein;
a key generation part configured to generate key information for use in encryption and decryption of information;
a data conversion part configured to encrypt information to be outputted to an external apparatus based on said key information, and decrypt encrypted input information inputted from said external apparatus based on said key information; and
an instruction part configured to discriminate said input information decrypted by said data conversion part, and give execution instruction of a predetermined operation in accordance with said input information,
wherein
in a case where said input information includes a read-out command for reading out said predetermined information, said instruction part gives generation instruction of said key information to said key generation part and gives read-out instruction to said storage part in accordance with said read-out command, said key generation part generates new key information in accordance with said generation instruction within a read-out time period in which said storage part reads out said predetermined information in accordance with said read-out instruction.

16. The memory device according to claim 15, wherein said data conversion part updates key information using said new key information.

17. The memory device according to claim 16, wherein said key information is updated within said read-out time period.

18. The memory device according to claim 15, wherein said key generation part includes a shift part configured to shift a bit string that forms said key information each time said generation instruction is received to thereby generate said new key information.

19. The memory device according to claim 18, wherein said shift part includes a shift register.

20. The memory device according to claim 18, further comprising a fixed hardware key implemented as hardware, wherein
said instruction part gives initialization instruction to said key generation part in accordance with an input of an initialization command from said external apparatus,
said key generation part generates initial key information using said hardware key in accordance with said initialization instruction,
said new key information is acquired by sequentially shifting a bit string that forms said initial key information in accordance with said generation instruction.

21. The memory device according to claim 19, further comprising a fixed hardware key implemented as hardware, wherein
said instruction part gives initialization instruction to said key generation part in accordance with an input of an initialization command from said external apparatus,
said key generation part generates initial key information using said hardware key in accordance with said initialization instruction,
said new key information is acquired by sequentially shifting a bit string that forms said initial key information in accordance with said generation instruction.

22. The memory device according to claim 15, wherein said key generation part generates said new key information using a stream encryption method or a block encryption method each time said generation instruction is received.

23. The memory device according to claim 22, further comprising a fixed hardware key implemented as hardware, wherein
said key generation part performs encryption by said stream encryption method or said block encryption method, and generates said key information based on said hardware key.

24. A memory device comprising:
a storage part storing predetermined information therein;
a key generation part configured to generate key information for use in encryption and decryption of information;
a data conversion part configured to encrypt information to be outputted to an external apparatus based on said key information, and decrypt encrypted input information inputted from said external apparatus based on said key information; and
an instruction part configured to discriminate said input information decrypted by said data conversion part, and give execution instruction of a predetermined operation in accordance with said input information,
wherein
said key generation part generates new key information at a predetermined timing,
in a case where said input information includes a read-out command for reading out said predetermined information, said instruction part gives read-out instruction to said storage part in accordance with said read-out command,
after starting to read out information in accordance with said read-out instruction, said storage part transmits a read-out start signal indicating that read-out processing is in execution to said data conversion part,
said data conversion part updates key information using said new key information in accordance with reception of said read-out start signal.

25. The memory device according to claim 24, wherein said key generation part includes a shift part configured to shift a bit string that forms said key information at said every predetermined timing to thereby generate said new key information.

26. The memory device according to claim 25, wherein said shift part includes a shift register.

27. A memory device comprising:
a storage part storing predetermined information therein;
a key generation part configured to generate key information for use in encryption and decryption of information;
a data conversion part configured to encrypt information to be outputted to an external apparatus based on said key information, and decrypt encrypted input information inputted from said external apparatus based on said key information; and
an instruction part configured to discriminate said input information decrypted by said data conversion part, and give execution instruction of a predetermined operation in accordance with said input information,
wherein
said key generation part generates new key information at a predetermined timing,
in a case where said input information includes a read-out command for reading out said predetermined information, said instruction part gives update instruction of said key information to said data conversion part and gives read-out instruction to said storage part in accordance with said read-out command,
said data conversion part updates key information using said new key information in accordance with said update instruction within a read-out time period in which said storage part reads out said predetermined information in accordance with said read-out instruction.

28. The memory device according to claim 27, wherein said key generation part includes a shift part configured to shift a bit string that forms said key information at said every predetermined timing to thereby generate said new key information.

29. The memory device according to claim 28, wherein said shift part includes a shift register.

30. A control method for a memory device, comprising the steps of:
(a) encrypting information to be outputted to an external apparatus based on key information for use in encryption and decryption of information, and decrypting encrypted input information inputted from said external apparatus based on said key information;
(b) discriminating said input information decrypted in said step (a), and giving execution instruction of a predetermined operation in accordance with said input information; and (c) generating new key information,
wherein
in said step (b), in a case where said input information includes a read-out command for reading out predetermined information stored in a storage part, execution instruction of said step (c) is given and a read-out instruction in accordance with said read-out command is given to said storage part, and
in said step (c), said new key information is generated within a read-out time period in which said storage part reads out said predetermined information in accordance with said read-out instruction.

\* \* \* \* \*